(12) United States Patent
Lockwood et al.

(10) Patent No.: US 11,971,153 B2
(45) Date of Patent: Apr. 30, 2024

(54) BATTERY STORAGE VAULT AND UTILITY POLE SYSTEM

(71) Applicant: Comptek Technologies, LLC, Boulder, CO (US)

(72) Inventors: James D. Lockwood, Boulder, CO (US); Kenneth Michael Hoganson, Aurora, CO (US); Dana Anthony Castronova, Broomfield, CO (US)

(73) Assignee: Comptek Technologies LLC, Broomfield, CO (US)

( * ) Notice: Subject to any disclaimer, the term of this patent is extended or adjusted under 35 U.S.C. 154(b) by 416 days.

(21) Appl. No.: 17/203,238

(22) Filed: Mar. 16, 2021

(65) Prior Publication Data
US 2021/0207781 A1   Jul. 8, 2021

Related U.S. Application Data

(63) Continuation of application No. 16/717,663, filed on Dec. 17, 2019, now Pat. No. 10,948,143.

(60) Provisional application No. 62/780,451, filed on Dec. 17, 2018.

(51) Int. Cl.
*E04H 12/00* (2006.01)
*F21S 8/08* (2006.01)
*F21S 9/02* (2006.01)
*H02J 3/32* (2006.01)
*H02J 7/02* (2016.01)

(52) U.S. Cl.
CPC ............. *F21S 8/086* (2013.01); *E04H 12/00* (2013.01); *F21S 9/022* (2013.01); *H02J 3/32* (2013.01); *H02J 7/02* (2013.01)

(58) Field of Classification Search
CPC .. F21S 8/085; F21S 8/086; F21S 8/088; F21S 9/00; F21S 9/02; F21S 9/022; E04H 12/00; H02J 3/32; H02J 7/02; H02J 7/1423
See application file for complete search history.

(56) References Cited

U.S. PATENT DOCUMENTS

| 1,742,481 | A | * | 1/1930 | Miller | E04H 12/32 |
| | | | | | 116/173 |
| 4,841,416 | A | * | 6/1989 | Doss | F21S 8/088 |
| | | | | | 362/276 |
| 6,216,414 | B1 | * | 4/2001 | Feldberg | E04C 3/32 |
| | | | | | 52/302.5 |
| 6,820,389 | B1 | * | 11/2004 | Macchietto | E04H 12/2261 |
| | | | | | 248/156 |
| 7,731,383 | B2 | * | 6/2010 | Myer | F21S 9/037 |
| | | | | | 362/373 |

(Continued)

*Primary Examiner* — Chi Q Nguyen
(74) *Attorney, Agent, or Firm* — Russell Manning; FisherBroyles, LLP

(57) ABSTRACT

Utility pole system having a battery storage housing defining a top portion, a bottom portion, and an interior volume with an access opening extending through the top portion; a pole with an upper end and a lower end attached to the top portion of the battery storage housing; and means for moving the pole from the first position where the lower end of the pole covers the access opening of the battery housing, and a second position where the lower end exposes the access opening. The utility pole system might also include electrical components powered by a battery provided in the battery storage housing, such battery charged by utility power.

14 Claims, 15 Drawing Sheets

(56) References Cited

U.S. PATENT DOCUMENTS

| | | | | |
|---|---|---|---|---|
| 7,980,725 B2* | 7/2011 | Yu | ............................ | F21S 9/037 |
| | | | | 362/183 |
| 7,988,320 B2* | 8/2011 | Brumels | .................. | F21S 8/086 |
| | | | | 362/191 |
| 10,947,751 B2* | 3/2021 | Lockwood | .............. | E04H 12/02 |
| 10,948,143 B2* | 3/2021 | Lockwood | ............ | H02J 7/0063 |
| 2011/0085322 A1* | 4/2011 | Myer | .................. | H01L 31/0521 |
| | | | | 362/183 |
| 2012/0020060 A1* | 1/2012 | Myer | ...................... | F21V 29/71 |
| | | | | 362/183 |
| 2018/0283666 A1* | 10/2018 | Beausoleil | .............. | E04H 17/20 |
| 2020/0109831 A1* | 4/2020 | Daghistani | .............. | F21S 8/086 |
| 2020/0190842 A1* | 6/2020 | Ducros | .................. | H02G 3/083 |

* cited by examiner

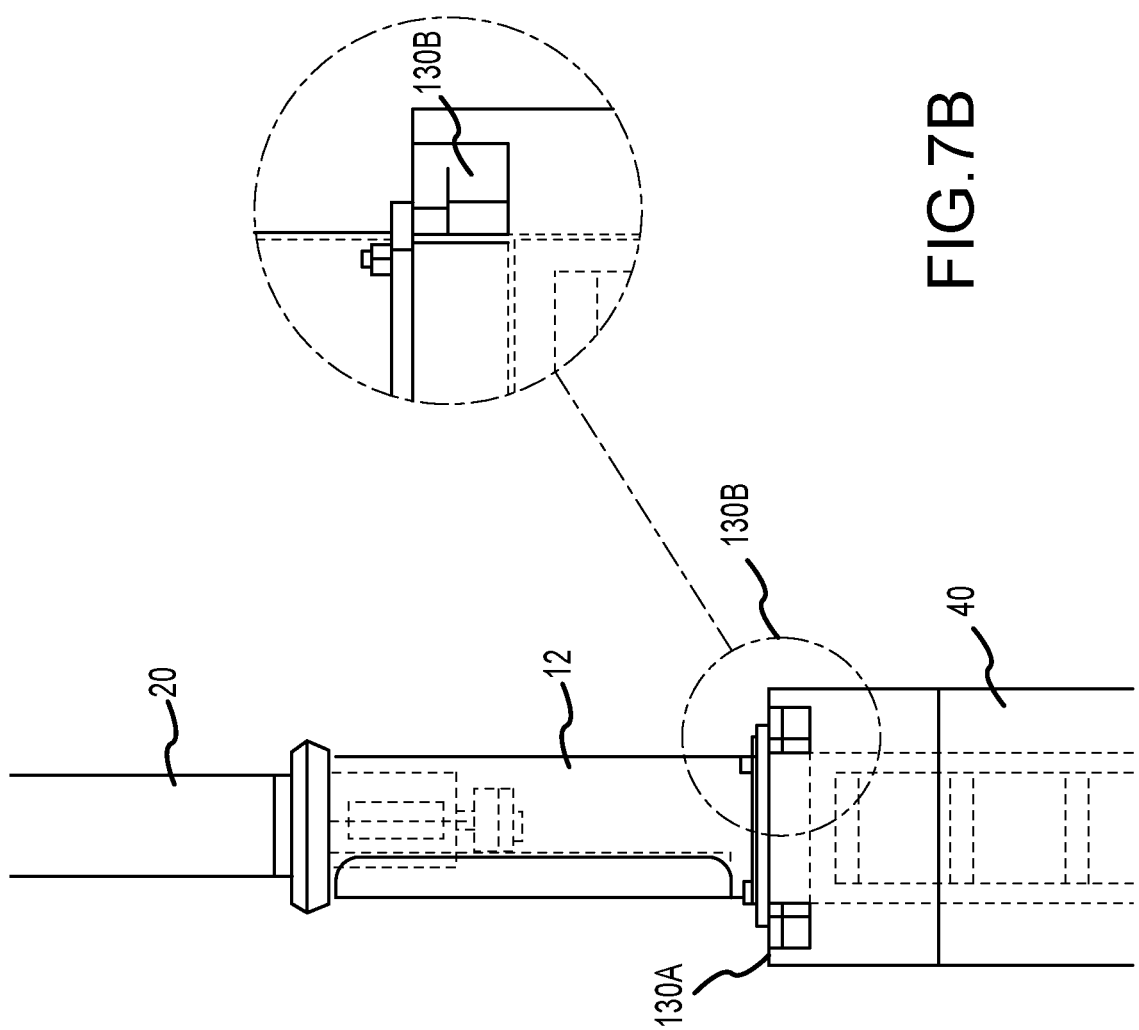

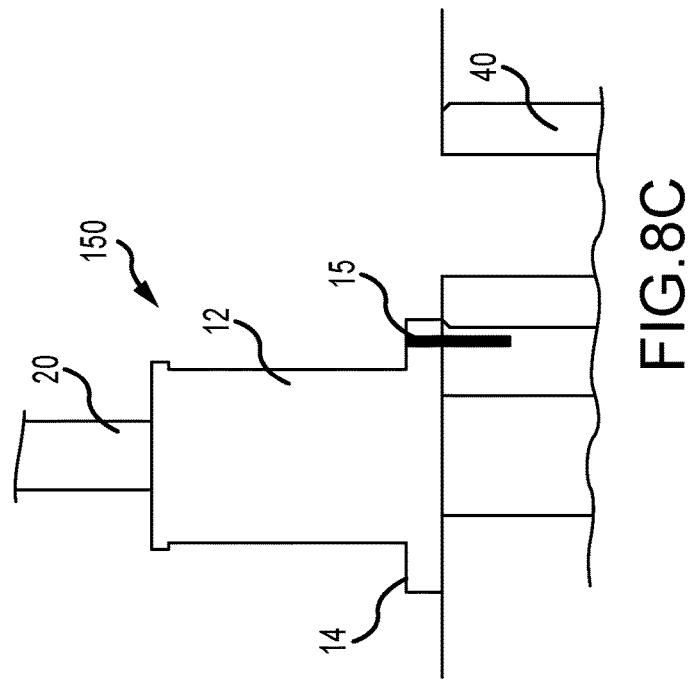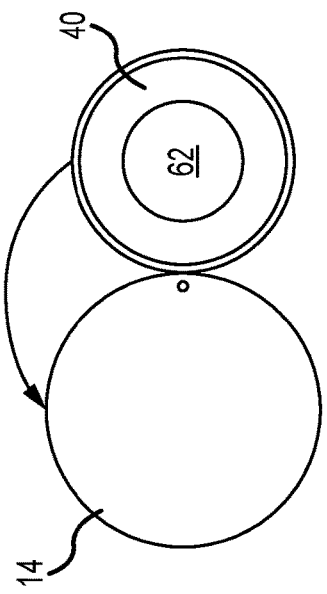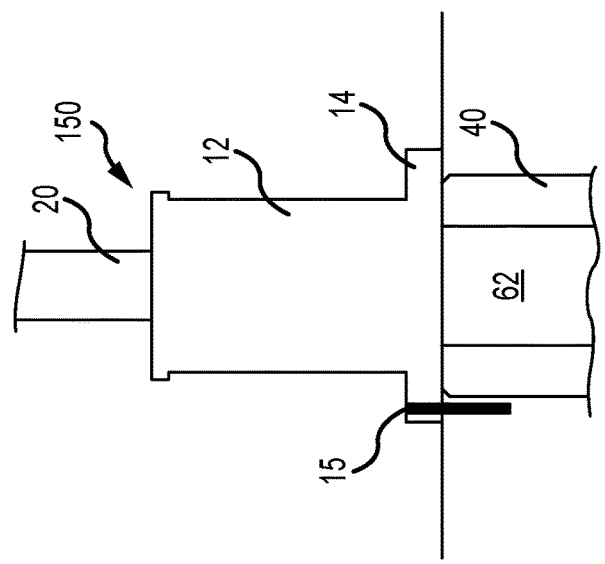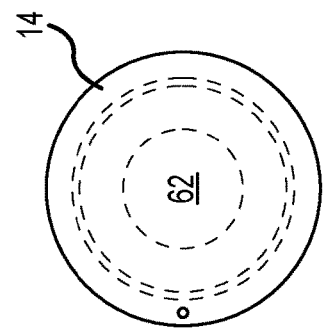

BATTERY STORAGE VAULT AND UTILITY POLE SYSTEM

CROSS REFERENCE

The present application claims the benefit of the filing date of U.S. Provisional Application No. 62/780,451 having a filing date of Dec. 17, 2018, the entire contents of which is incorporated herein by reference.

FIELD

The present disclosure is directed to utility poles such as light poles, power poles and small cell poles. More specifically, the present disclosure is directed to a utility pole having a battery storage vault disposed below the base of the utility pole. The battery storage vault is configured to hold rechargeable batteries. The utility pole is configured to move relative to the battery storage vault to permit access to the batteries or battery packs therein.

BACKGROUND

In many urban settings, public or quasi-public infrastructure is often located in the right-of-way of public roads. For instance, utility poles such as street lights and power poles are often located in the right-of-way of roads and/or highways. For example, such utility poles are often positioned on or at the edge of pedestrian sidewalks.

In addition to street lights and power poles, small cell poles are increasingly being located at street level (e.g., in the public right-of-way). That is, with the increasing use of mobile data, a trend has been toward increasing the density of cell poles in urban environments. By way of example, proposed 5G wireless networks promise greatly improved network speeds and are currently being planned and implemented. Such networks require shorter RF transmission distances compared to existing networks and require more dense networks of access points/small cell poles to handle data traffic. This often results in a densification of infrastructure in the public right-of-way. In various municipalities, small cell poles having configurations that support cell equipment and street lights are replacing existing street lights. This allows dual use of the utility pole location. Stated otherwise, additional infrastructure is provided without increasing the density of the infrastructure.

SUMMARY

Various aspects of the present disclosure are based on the realization that significant infrastructure exits that could be upgraded for additional uses without additional densification of public areas. For instance, various utility poles currently exist within public right-of-ways (as well as other locations) that could be upgraded for additional uses. By way of example, an urban city block of approximately 330 feet by 330 feet may contain approximately sixteen streetlights. Such streetlights are typically included within the public right-of-way and are typically connected to the electricity grid. These existing streetlights (or other utility poles) provide existing infrastructure locations that may further utilized. For instance, such existing utility poles may be replaced with utility poles that incorporate power storage (e.g., battery storage locations). In the case of a city block having 16 streetlights, if each pole location stored 50 kWh of energy, a combined power storage system could store 800 kWh of energy without increasing the number of poles (i.e., infrastructure) in the local environment (e.g., on a sidewalk), where space may be at a premium. Such an amount of energy may be utilized in various ways.

In one arrangement, the present disclosure is directed to the use of an at least partially sub-grade base or vault and utility pole, where the vault houses batteries or battery packs. In such an arrangement, the vault associated utility pole may be termed a 'battery storage pole'. In an arrangement, the vault may be disposed directly beneath the utility pole. The number of the batteries disposed within the sub-surface vault may be varied depending on depth and/or width of the vault. In an arrangement, each battery storage pole may be connected to a local electric grid for recharging. In another arrangement, each battery storage pole may be connected to a source of renewable power (e.g. photovoltaic panels) for recharging. In either arrangement, the battery storage poles may permit operation of components supported by the pole when, for example, grid power is absent. For example, when the battery storage pole is a small cell pole, the batteries disposed within the vault may allow for several hours or even days of continued operation of cell equipment maintained on or within the pole. In such an instance, infrastructure may continue to operate during a grid blackout or other diversion of grid power. In such an arrangement, the battery storage pole may further include an inverter, controller and a switch that allows the battery storage pole to be disconnected from the grid in the event of power failure.

In an arrangement, a battery pole system includes a pole (e.g., which may include a base cabinet) and a battery storage housing or vault. A lower end of the pole is connected to an upper end of the battery storage vault. The pole is configured to move between first and second positions relative to the battery storage vault. This movement permits the pole to selectively cover and expose an access opening in the vault to provide access thereto. In an arrangement, the pole is configured to move laterally relative to a vertical axis of the pole (e.g., while the pole is upright). In such an arrangement, the pole may move along a track. In a further arrangement, the pole is configured to rotate relative to the vault. In one such arrangement, the pole rotates about a vertical axis that is substantially parallel to a vertical axis or long axis of the pole. That is, the pole rotates while in an upright position. In another rotating arrangement, the pole rotates about an axis that is transverse to the long axis of the pole. That is, the pole may be laid down to access the battery vault.

In a further arrangement, a plurality of battery storage poles may collectively define a battery storage system. That is, the plurality of battery storage poles may be electrically connected for use as a common storage system. In one arrangement, the battery storage system may be charged by a local electric grid and discharged when needed. In the latter regard, the battery storage system defined by the battery storage poles/vaults may controllably discharge to smooth or level the loads on the local grid. For instance, during periods of peak demand, the battery storage system may discharge to reduce the load (e.g., inductive load) on the grid. Conversely, during times of low grid usage, the battery storage system may charge the batteries of the individual storage poles. Stated otherwise, the battery storage system may provide a source or a sink to balance the load of the grid.

In an arrangement, the battery storage poles may form a micro-grid. Such a micro-grid may be selectively connectable to an electrical grid (e.g., utility grid) for charging.

However, the micro-grid may be disconnected from the grid such that the micro-grid may operate when grid power is not available.

The ability to store significant amounts of electrical power utilizing space that was previously occupied by other infrastructure allows storage of significant energy resources proximate to commercial and/or residential user while providing a minimal foot print in the environment.

In an arrangement, the battery storage poles are small cell poles that may be configured for use in urban environments. In various implementations, the small cell poles have configurations similar to existing utility poles (e.g., street lights), which minimizes their aesthetic obtrusiveness. The small cell poles, in addition to battery storage, include cell equipment.

In an arrangement, temperature management systems may be provided for the batteries. In one arrangement, a fire suppression system may be provided in case the batteries overheat. In another arrangement, the vault is a watertight caisson. In a further arrangement, the vault includes a lift system that permits elevating the batteries therein to ground level for servicing.

Any of the aspects of the principles detailed above may be combined with any of the other aspect detailed herein.

BRIEF DESCRIPTION OF THE DRAWINGS

FIGS. 7A and 7B illustrate a track system that permits the movement of the embodiment of FIGS. 6A-6C.

FIGS. 8A-8D illustrate a second embodiment of a battery storage pole that moves between a first position and a second position.

The attached drawings show various views and optional dimensions, according to various exemplary embodiments, for the various components of the small cell smart pole. Throughout the drawings, identical reference numbers designate similar, but not necessarily identical, elements.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

The present disclosure is directed to battery storage poles that are, in an embodiment, configured for use in urban environments. In various embodiments, the battery storage poles include a subterranean battery vault disposed below a utility pole. In an embodiment, the utility pole is small cell pole that may, but need not, incorporate light masts. Various embodiments of the presented inventions are related to the recognition by the inventors that existing utility poles provide a location that may conveniently store significant amounts of energy within, for example, an urban environment without increasing the amount of infrastructure within that environment. By way of example, most streets already have several light poles and/or power poles in their right-of-ways. Accordingly, by replacing an existing pole with a battery storage pole, energy may be stored in an area without increasing the number of infrastructure elements in or on the right-of-way of a street.

Figure 1:
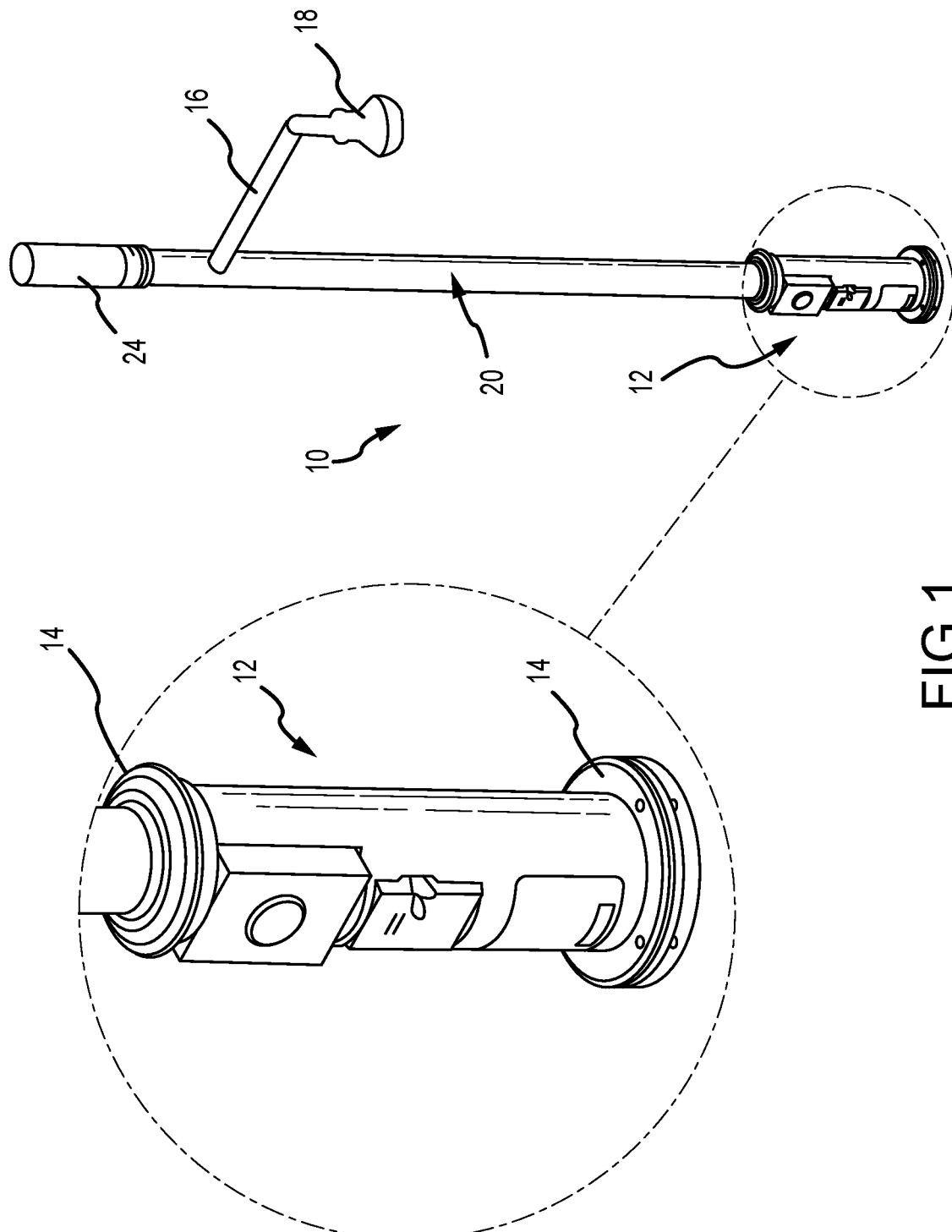
FIG. 1 illustrates one embodiment of a small cell pole and street light.

FIG. 1 illustrates one embodiment of a small cell pole 10 that may be utilized with a battery vault (e.g., forming a battery storage pole) as discussed herein. Various features of this small cell pole are disclosed in co-owned U.S. Patent Publication No. 2017/0279187, the entire contents of which are incorporated herein by reference. Though discussed herein as a small cell pole, it will be appreciated other poles (e.g., light poles) may be utilized with a battery storage vault to form a battery storage pole. Accordingly, the following description showing a small cell pole used with a battery storage vault is presented by way of example and not by way of limitation. As shown, the cell pole includes a lower equipment housing 12 that includes an inner cavity (e.g., interior) configured to house cell control equipment. The equipment housing 12 has a lower flange 14 used to mount the housing to a surface (e.g., ground or subterranean vault). Typically, utility power and/or communications (e.g., fiber optic cables) are routed through the base of the equipment housing. Other installation methods are possible (e.g., above and in-ground vault). Access panels and/or doors may be mounted to the equipment housing 12 to enclose equipment from the elements, while providing selective access, when desired, to modify, regulate, change out, or otherwise access the equipment. The housing may include locks, hinges, access doors, vents for passive radiant cooling, and/or viewing ports. Cable ports and other features may be formed therein during manufacture.

Fasteners, such as threaded posts or bolts, are formed on an upper surface (e.g., flange; not shown) of the equipment housing 12 to facilitate attachment of a pole 20, which may support one or more antenna structures 24. As shown, the cell pole 10 has a two-part design: the lower equipment housing 12 and the pole 20. The two-part construction allows for easier construction and implementation during set-up. That is, the equipment housing 12 can be installed separately from the pole 20 and/or antenna structure 24. Additionally, any equipment contained in the equipment housing may be installed at a later time. The present embodiment also illustrates a light mast or arm 16 attached to an upper portion of the pole 20. The illustrated light mast 16 supports a street light 18. As set forth in U.S. Patent Publication No. 2017/0279187, which is incorporated herein by reference, the interior of the equipment housing 12 may open into the generally hollow interior of the pole 20. This allows passage of cables from the equipment housing(s) into the center of the pole to one or more antennas and/or lights etc.

Figure 2:
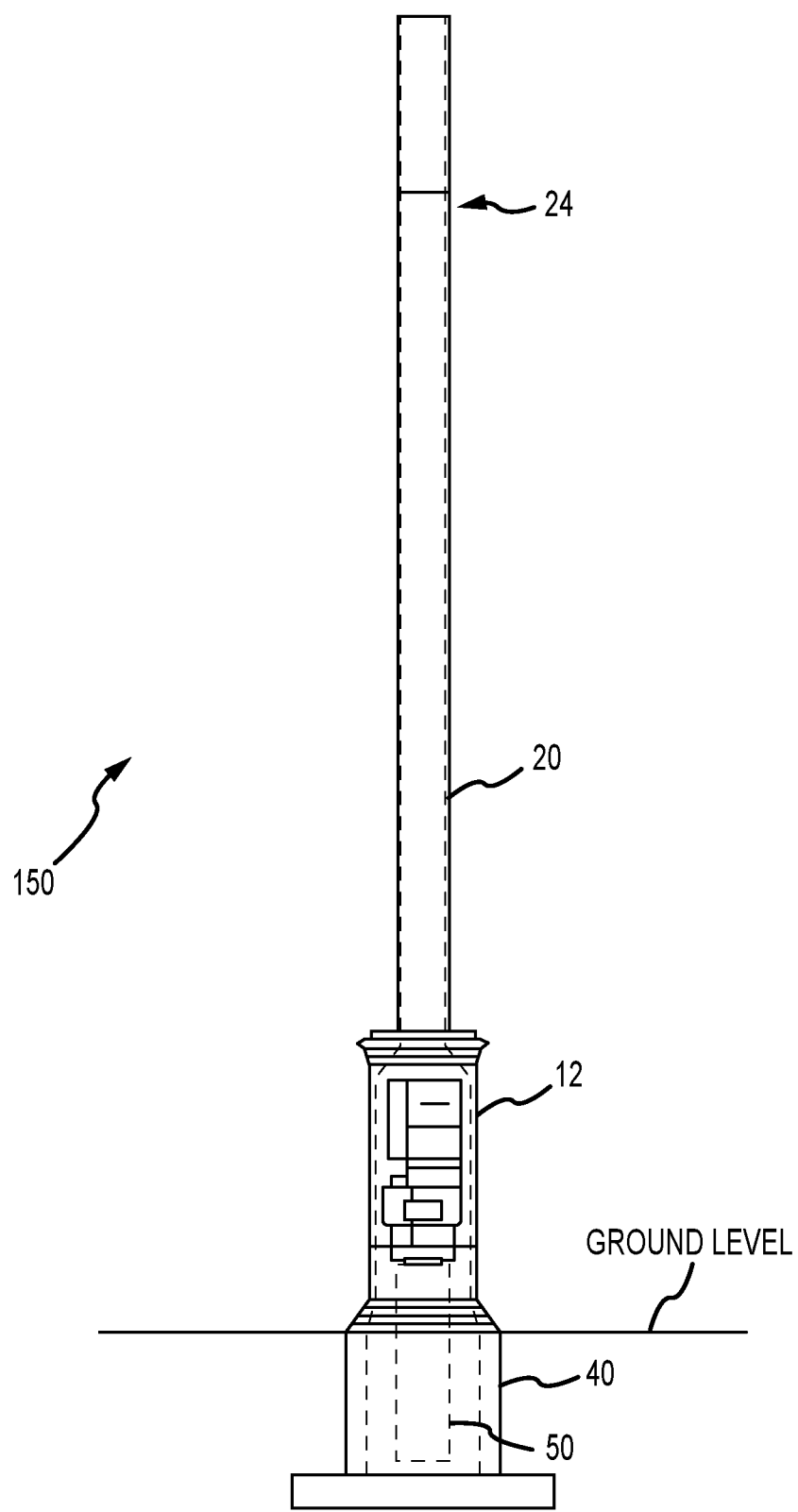
FIG. 2 depicts a small cell pole supported by a sub-surface vault.

FIG. 2 depicts a side view of the exemplary cell pole 10 where the lower housing 12 is disposed above an at least partially subterranean vault 40. The vault is configured to house a plurality of batteries and may be termed a battery storage housing. In this example, the flange 14 of the cell pole 10 has multiple openings for receiving threaded bolts that may extend from the vault 40. Such threaded bolts (e.g., extending from the vault 40) are aligned and interconnected with the flange's bolt holes. Nuts can be used to secure the flange (and therefore, the housing and pole) to the vault. When the vault 40 holds batteries 50 for energy storage, the vault and an attached pole may be termed a 'battery storage pole' 150.

The vault 40 may be at least partially underground (e.g., sub-surface or subterranean). By keeping at least a portion of the vault underground, the pole's entire center of gravity may be kept low to the ground, or even underground, thereby increasing the pole's stability. The vault 40 generally provides an interior space for storing batteries 50, however, various additional component such as electronics, processors, memory, sensors, timers, thermometers, other types of devices, or combinations thereof may be disposed within the interior of the vault.

In the illustrated embodiment, the battery storage pole 150 houses a plurality of vertically stacked power packs/battery packs 50*a*-50*nn* (hereafter 50 unless specifically referenced) disposed within the vault 40. It has been recognized that existing utility poles provide a location that may conveniently store significant amounts of energy within, for example, an urban environment without increasing the amount of infrastructure within that environment. By way of example, most streets already have several light poles and/or various utility poles (e.g., power poles) in their right-of-ways. Accordingly, by replacing an existing pole with a battery storage pole 150, energy may be stored in an area without increasing the number of infrastructure elements in or on the right-of-way of a street.

Figure 3A:
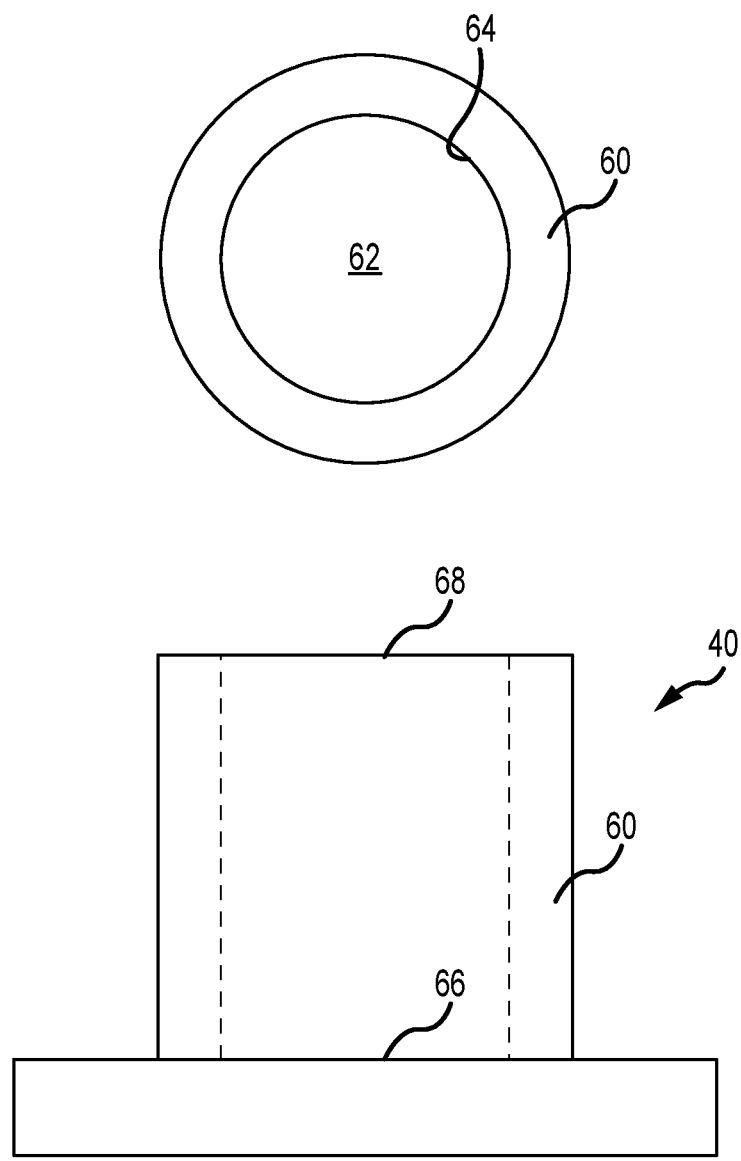
FIGS. 3A-3C depict three embodiments of a sub-surface vault.
Figure 3B:
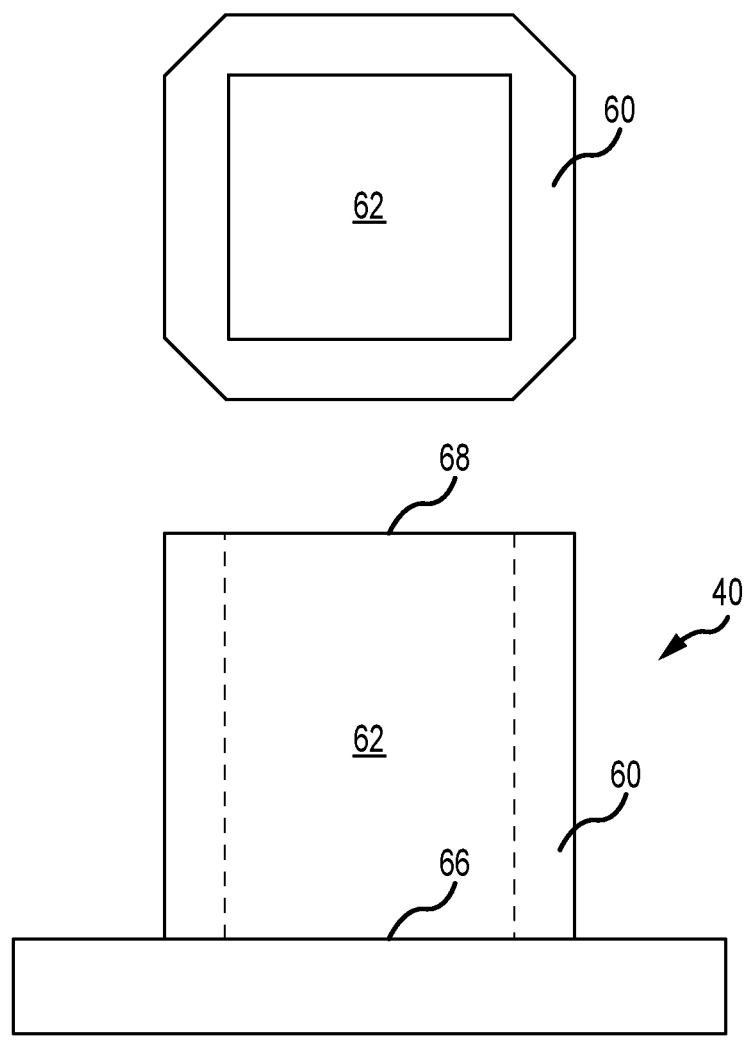
Figure 3C:
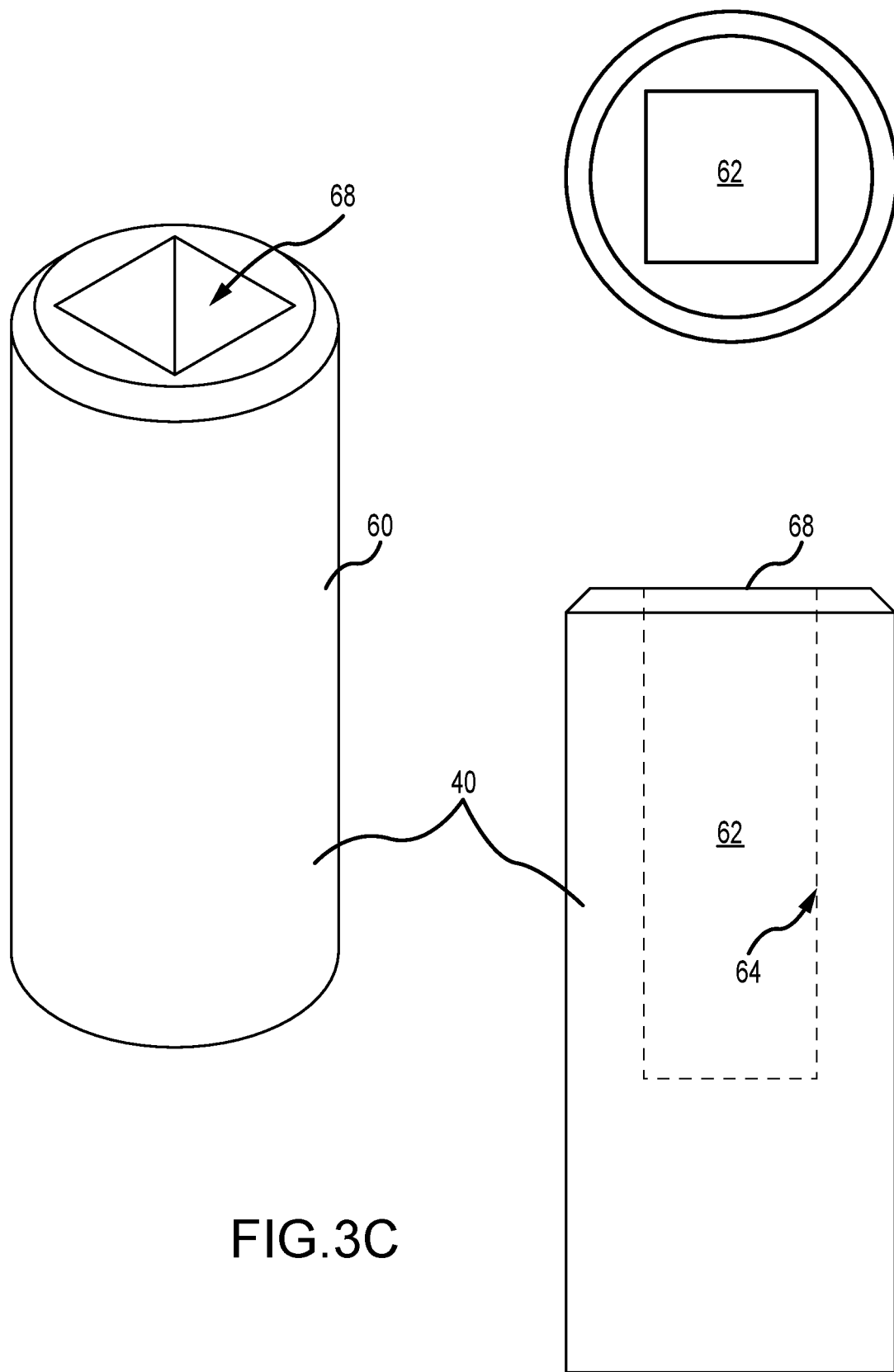

As shown in FIG. 2, the top edge of the vault 40 is substantially flush with the ground surface. However, this is not a strict requirement. What is important is that the interior of the vault (e.g., cavity) provides an interior space that will house one or more battery packs. FIGS. 3A-3C illustrate various embodiments of the vault 40, which, in an arrangement, may be formed of precast concrete. However, it will be appreciated that the vault may be cast in place or made of different materials. As shown, the embodiment of the vault 40 of FIG. 3A has a generally cylindrical sidewall 60 with a cylindrical inside surface 64 a closed bottom surface 66 and an upper opening 68 defined by a top edge of the sidewall 60. The upper opening forms an access opening into the vault. The access opening permits the insertion or removal of component into or from the vault. The inside diameter will typically be between about 15 inches and about 36 inches. However, other sizes are possible. As shown in the embodiment of FIG. 3B, the vault 40 has a generally square sidewall 60 with a rectangular inside surface 64 (e.g., rectangular prism), a closed bottom surface 66 and an open upper surface 68. The edge length (e.g., width) of the square interior is typically between about 15 inches and about 36 inches. The height of the sidewall may vary. In most applications it is expected to be between about 24 inches and about 48 inches. Other heights are possible. FIG. 3C illustrates a vault or caisson 40 having a cylindrical sidewall 60 and a square (e.g., rectangular prism) cavity 62.

Figure 4A:
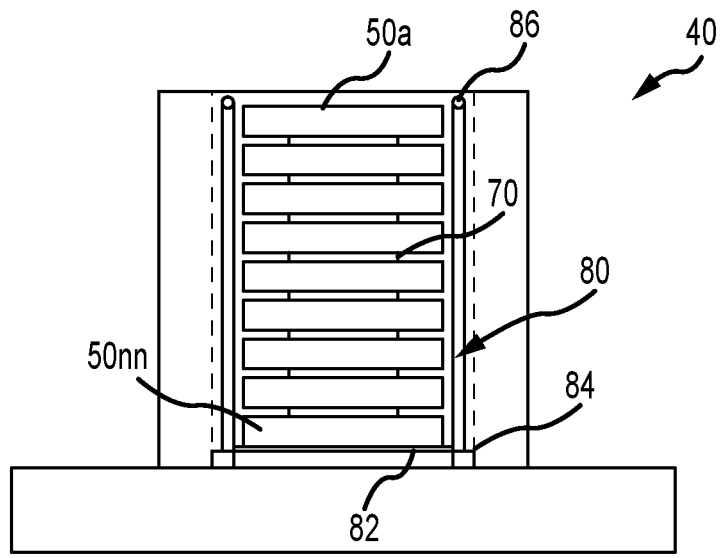
FIGS. 4A-4B illustrate a vault, batteries and lift system.
Figure 4B:
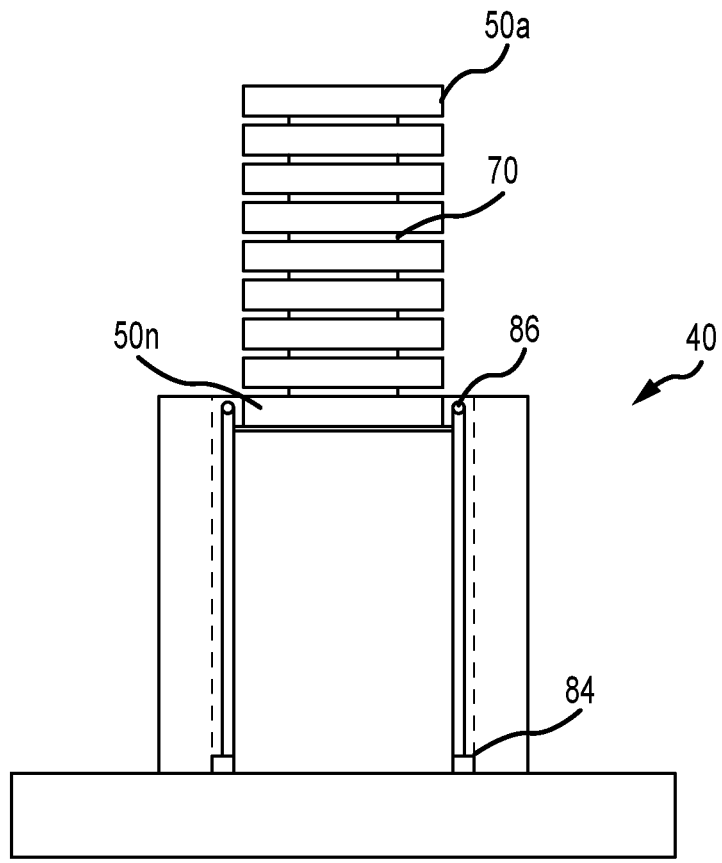
Figure 5A:
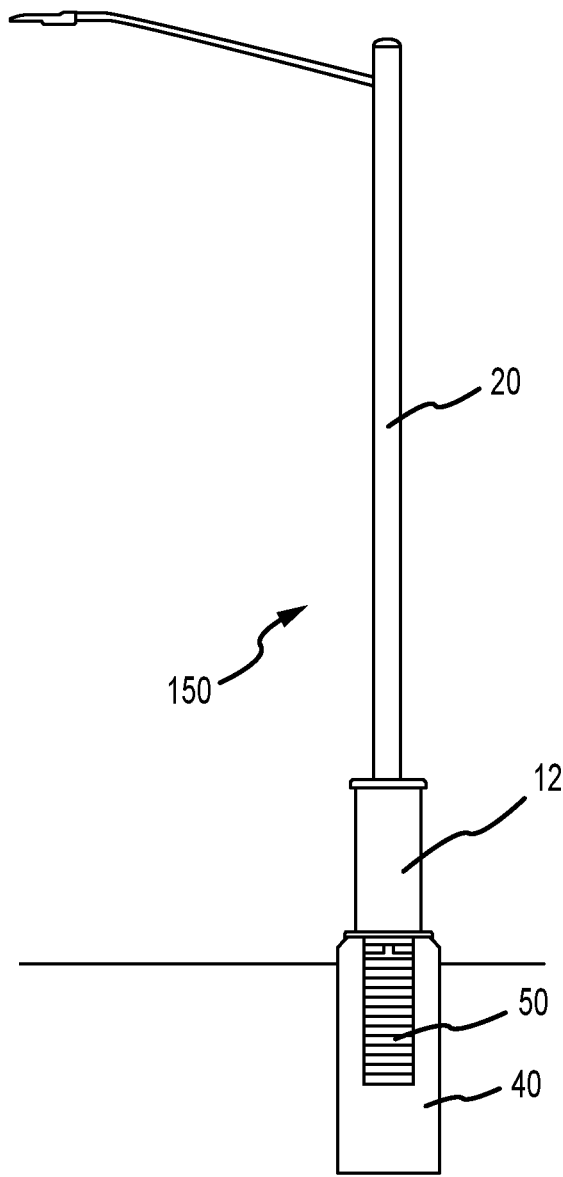
FIGS. 5A and 5B illustrate a lift system incorporated into a battery storage pole.
Figure 5B:
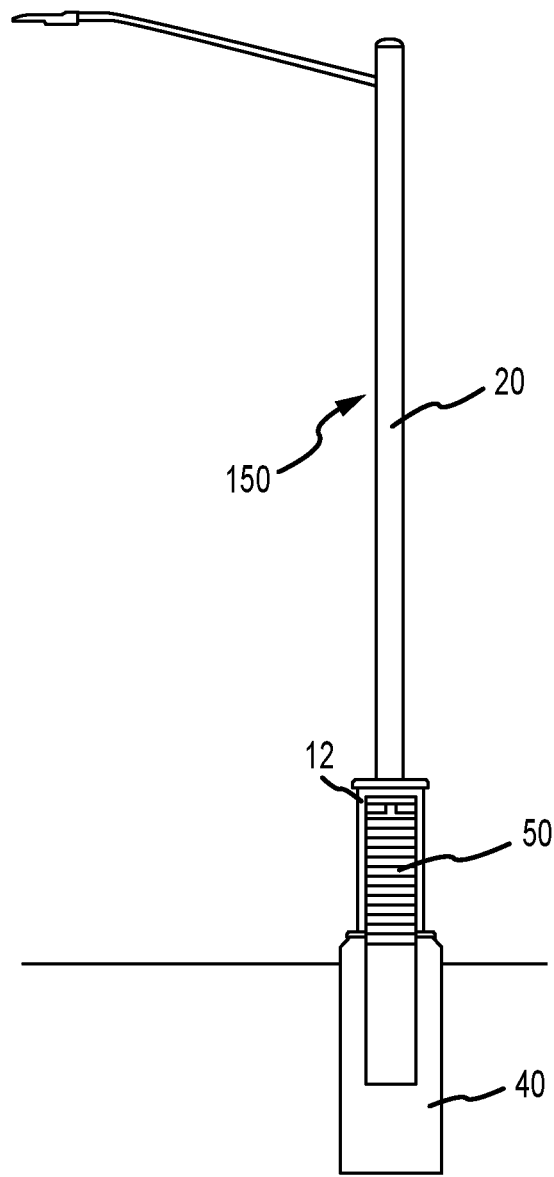

Typically, it is desirable that the interior cavity 62 of the vault 40 be substantially waterproof for battery storage. Along these lines, the interior and/or exterior of the vault 40 may include an impermeable liner. Likewise, the top edge of the vault may include a gasket or sealed cap to create a substantially weatherproof housing and/or seal with an attached pole, base cabinet etc. As shown in FIGS. 4A and 4B, the vault 40 may include a lift system 80. As will be appreciated, servicing and/or installing the batteries below ground surface may, at times, be problematic. Accordingly, such a lift system 80 permits raising the batteries 50 above grade once the pole is removed. In an exemplary embodiment, the lift system includes a platform 82, which supports the batteries 50, one or more winches 84, cables and pullies 86. In operation the winches 84 wind or unwind the cables to lift and lower the platform 82 and supported batteries 50. It will be appreciated that the lift system is presented by way of example. Other systems (e.g., track systems, hydraulic, pneumatic, etc.) may be utilized. FIGS. 5A and 5B illustrate a battery storage pole 150 having a pole 20, base cabinet 12 and battery vault 40. In this embodiment, the lift system is configured to lift the batteries 50 from the vault 40 into the base cabinet 12 for servicing. In such an arrangement, the base cabinet 12 nor pole 10 need be removed for servicing the batteries.

Figures 6A, 6B, 6C:
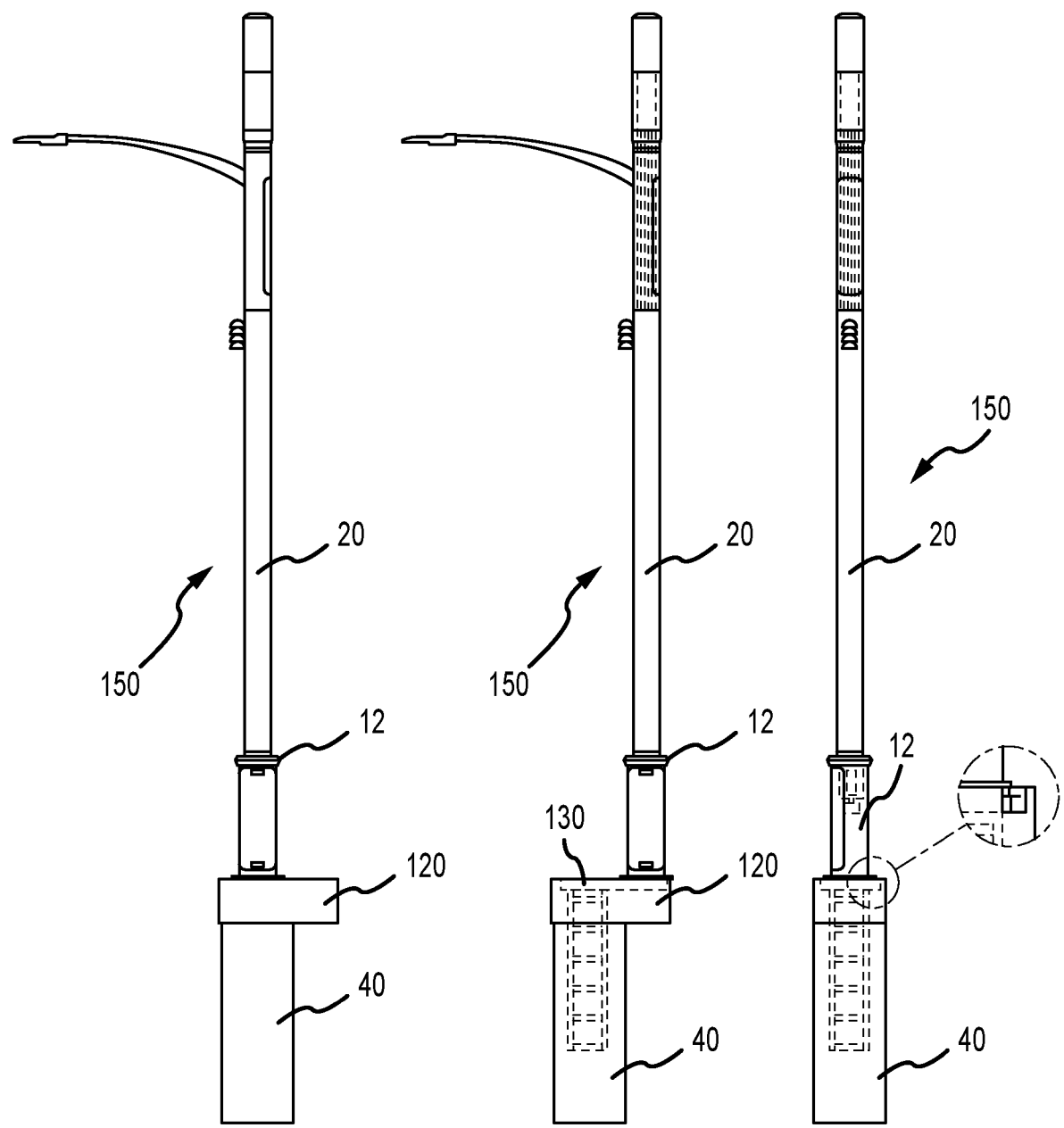
FIGS. 6A-6C illustrate a first embodiment of a battery storage pole that moves between a first position and a second position.

FIGS. 6A-6C illustrate another embodiment of a battery storage pole 150 having a pole 20, housing 12 and battery vault 40. In this embodiment, the pole 20 and, if utilized, base cabinet 12 are configured to move relative to the battery vault 40 to provide access to the interior of the vault. That is, the pole 20, which may or may not include a base cabinet 12, is configured to move from a first position relative to the vault 40 as shown in FIG. 6A to a second position relative to the vault 40 as shown in FIG. 6B. In such an embodiment, the pole 20 cover the access opening in the top surface of the vault 40 in the first position. Movement of the pole to the second position exposes the access opening in the vault permitting access to the interior of the vault 40. As will be appreciated, such movable positioning of the pole 10 and base cabinet allows the depth of the vault to be significantly increased in relation to the system described in FIGS. 5A and 5B which require the batteries to fit within a base cabinet of the pole.

Figure 7A:
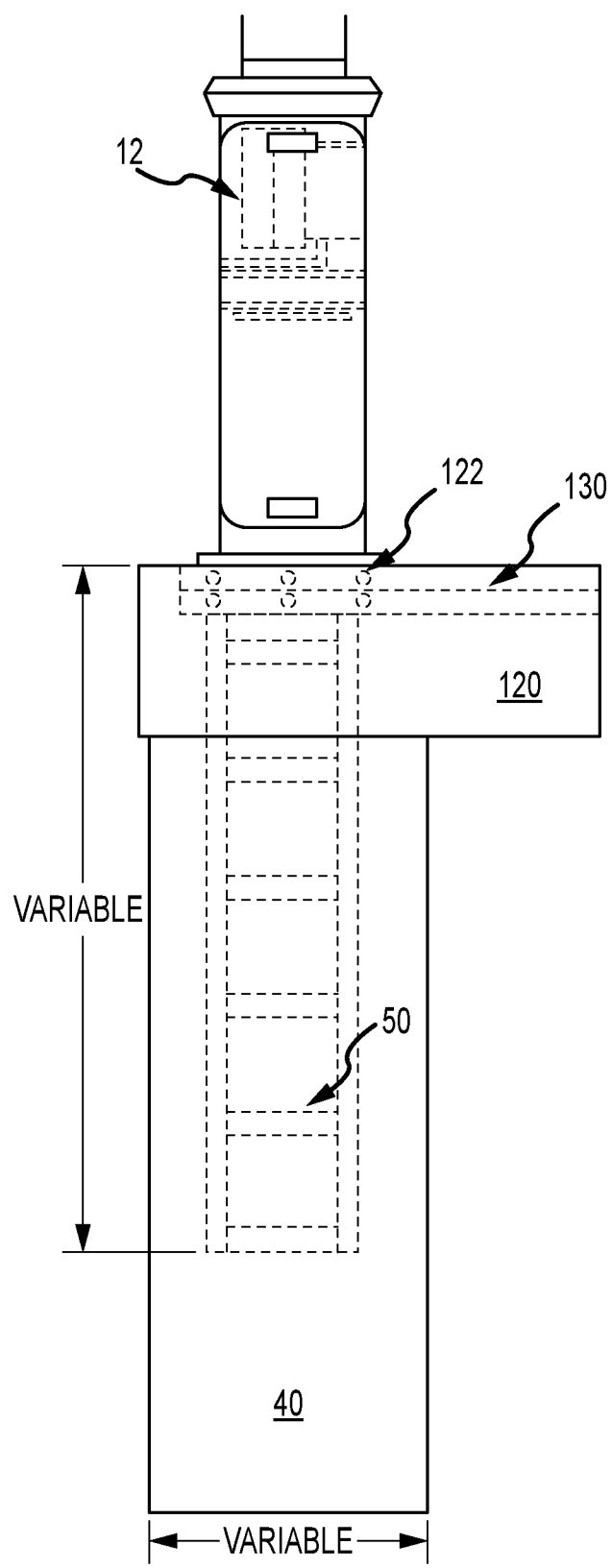

As shown in FIGS. 6A-6C, the pole defines a vertical axis of the system between its lower end and its upper end. In this embodiment, the pole moves in a direction that is substantially transverse to the vertical axis of the system. As best shown in FIGS. 7A and 7B, the illustrated embodiment utilizes a track system that movably mounts the pole 20 and cabinet 12 relative to the vault 40. In this embodiment, the vault 40 includes an upper foundation 120. However, the interior volume of the vault extends through the upper foundation. In the illustrated embodiment. the upper foundation 120 is elongated to provide support for a track 130 supported by the foundation. This track may be integrally formed within the foundation or may be a separate element affixed thereto (e.g., metal channel, etc.). In one arrangement, the track 130 includes first and second spaced tracks 130A, 130B. These tracks receive rollers 122 attached to opposing sides of the lower end of the base cabinet 12. That is, a plurality rollers connected to the base cabinet interface with the track to permit the base cabinet to move from the first position (e.g., FIG. 6A) to the second position (e.g., FIG. 6B). As will be appreciated, various locks may be implemented into the tracking system to fixedly maintain the pole relative to the vault. By way of example, the pole will primarily be disposed in the first position covering the access opening. Accordingly, one or more bolts, locks or other elements may be utilized to affix the position of the pole relative to the vault until access is needed to the interior of the vault. In an embodiment, the movement system (e.g., track system) may be at least partially automated. In such an embodiment, one or more motors and/or actuators may move the pole from the first position to the second position. However, this is not a requirement.

FIGS. 8A-8D illustrate another embodiment of a battery pole system 150 where the base of the pole 20 and/or cabinet 12 is configured to move relative the access opening in the top surface of the battery vault 40. As shown in FIG. 8A, the flange 14 of the cabinet 12 is disposed above the access opening of the vault 40. As shown in the partial top view of FIG. 8B, the cabinet 12 fully covers the access opening defined by the interior 62 of the vault 40 when the cabinet and pole are in a first position. In the present embodiment, the flange 14 is connected to a vertical axle pin 15 about which the cabinet 12 and pole may rotate. In the illustrated embodiment, the cabinet and pole are configured to rotate about a vertical axis of the pin 15 that is substantially parallel to the vertical axis defined by the pole. This is illustrated in FIGS. 8C and 8C, which show the cabinet 12 rotated about the axle pin 15 to a second position. As shown in the partial top view of FIG. 8D, once the cabinet 12 is rotated to the second position the interior volume 62 of the vault 40 is fully exposed. In such an arrangement, the axle pin 15 may include a bearing and may support the weight of the housing and pole. Further, it will be appreciated that one or more connectors may be provided to affix the housing when in the first position as shown in FIG. 8A. For instance, the flange 14 may include one or more recessed indentations (not shown) that rotate into contact with bolts or studs (not shown) extending from the vault or other ground level support structure. In such an arrangement, nuts on such studs may be removed prior to rotating the cabinet/pole to the second position. Likewise, when the cabinet is rotated back into the first position, the flange may engage the bolts/studs and nuts may engage the bolts/studs to affix the housing in the first position above the vault.

Figure 9A:
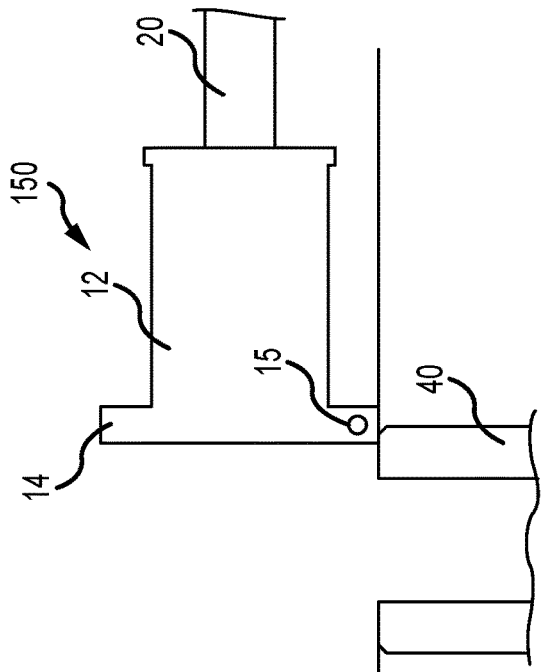
FIGS. 9A-9D illustrate a third embodiment of a battery storage pole that moves between a first position and a second position.
Figure 9B:
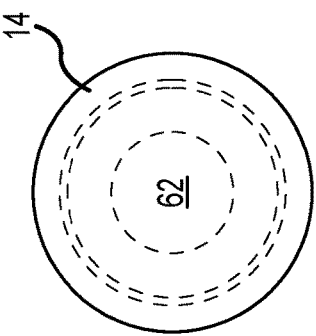
Figure 9C:
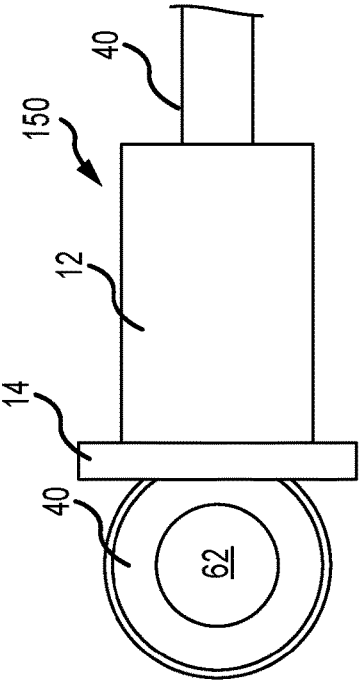
Figure 9D:
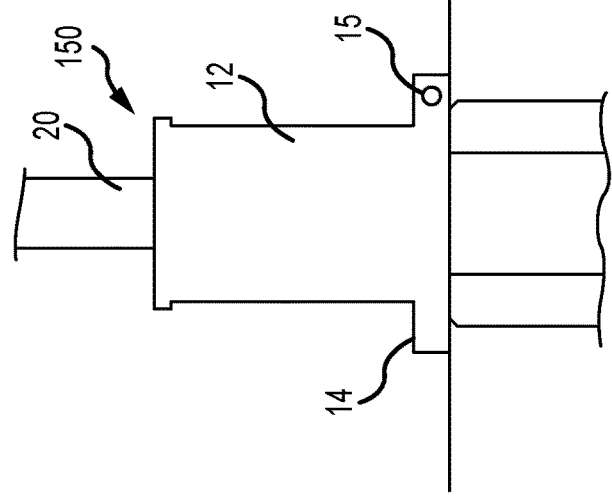

FIGS. 9A-9A illustrate another embodiment of a battery pole system 150 where the base of the pole 20 and/or cabinet 12 is configured to move relative the access opening in the top surface of the battery vault 40. As shown in FIG. 9A, the flange 14 of the cabinet 12 is disposed above the access opening of the vault 40. As shown in the partial top view of FIG. 9B, the cabinet 12 fully covers the access opening defined by the interior 62 of the vault 40 when the cabinet and pole are in a first position. In the present embodiment, the flange 14 is connected to a horizontal axle pin 15 about which the cabinet 12 and pole may rotate. In the illustrated embodiment, the cabinet and pole are configured to rotate about a vertical axis of the pin 15 that is substantially transverse to the vertical axis defined by the pole. This is illustrated in FIGS. 9C and 9C, which show the cabinet 12 rotated about the axle pin 15 to a second position. That is, the pole and cabinet are laid onto the ground to expose the battery vault.

As best illustrated in FIGS. 4A and 4B, the vault typically includes a plurality of stacked battery packs 50a-nn. In an embodiment where the vault 40 is cylindrical, each battery pack 50 may be a correspondingly circular/cylindrical element. In an embodiment, each battery pack is formed of a plurality of separate modules where each module houses a plurality of individual cells. In one embodiment, the modules each house individual lithium-ion (Li-ion) cells. In a specific embodiment, the cells are 18650 Li-ion rechargeable cells, typically 3.6-3.7 volts. In the one embodiment, cells of four modules are electrically connected in series to produce a 48 VDC module. These modules may be disposed in parallel and connected to adjacent battery packs. As illustrated in FIG. 4A, the system incorporates multiple stacked battery packs 50a-50n. The number of battery packs may be dictated by need and/or the height, diameter, (e.g., interior volume) of the cavity. Larger vaults may include more battery packs as more space is available. By way of example only, when utilizing the 18650 Li-ion batteries, a 48 VDC system having four modules per battery pack may have a diameter of 15 inches and a height of approximately 3-4 inches. Accordingly, each linear foot of height of the vault used as energy storage section may house three battery packs. Accordingly, a single battery pack vault and pole may store significant amounts of energy. In one embodiment, each vault may store 50 kWh of energy. However, it will be appreciated that the batteries, cells, sizes and capacities are provided herein by way of example and not by way of limitation. Other configurations are possible and within the scope of the presented disclosure.

As shown in FIG. 4A, the separate battery packs 50 are connected by power and data connectors 70. Such connection may be achieved in any appropriate manner. For instance, each module may have surface contacts that connect to surface contacts of adjacent battery packs. Other connections are possible. In any embodiment, the power connector 70 is attached to a power source (not shown). In one embodiment, the power source is AC power from the local electric grid. As will be appreciated, when the battery storage utility pole replaces an existing light pole or street light, power is already provided to the street light from the local electric grid. Accordingly, this power source may be utilized to charge the battery packs within the vault. If available, renewable energy may form the power source for the battery storage pole. In any arrangement, the battery storage pole may further include a charge controller(s) to manage charging and/or discharging of the battery packs. For instance, such charge controller may include a rectifier to convert AC grid energy to DC energy for use in charging the battery packs. Likewise, the charge controller may include an inverter for converting DC energy from the batteries to AC energy having appropriate voltage amperage and phase, which may be fed back into the electrical grid or otherwise utilized. The system may further include a power disconnect switch allowing the pole to disconnect from the grid in the event of power failure. In such an arrangement, the batteries may allow continued operation of the utility pole (e.g., street lights. Cell tower etc.) during a power outage. In various arrangements, the charge controllers may include various processors, storage devise and/or communication protocols. Along these lines, the battery storage poles may be controlled remotely and/or report to a centralized controller.

The battery storage vault may include additional components. In an embodiment, the vault may include one or more vents and or fans to circulate cooling air through the battery packs. In a further arrangement, active fire suppression may be provided. By way of example, a clean agent fire safety system may disperse an inert gas or halocarbon gases, etc. to suppress a fire. Other fire suppression systems are possible and within the scope of the presented disclosure.

In addition to cell equipment and streetlights, it will be appreciated that the battery storage utility pole may be utilized for different purposes and/or incorporate other electrically powered sensors and devices. By way of example, the battery storage pole may form a traffic light pole supporting traffic lights, cameras and cross walk sensors to name a few potential powered devices. In any configuration (e.g., small cell/light pole, traffic light, power pole etc.), the battery storage pole may be operative to self-power its supported components in the event of loss of primary power (e.g., grid power). By way of example, a small cell pole having 50 kWh of storage could continue normal operation for several days during a power outage. Other battery storage poles supporting other functions may also continue to operate during outages.

Figure 10:
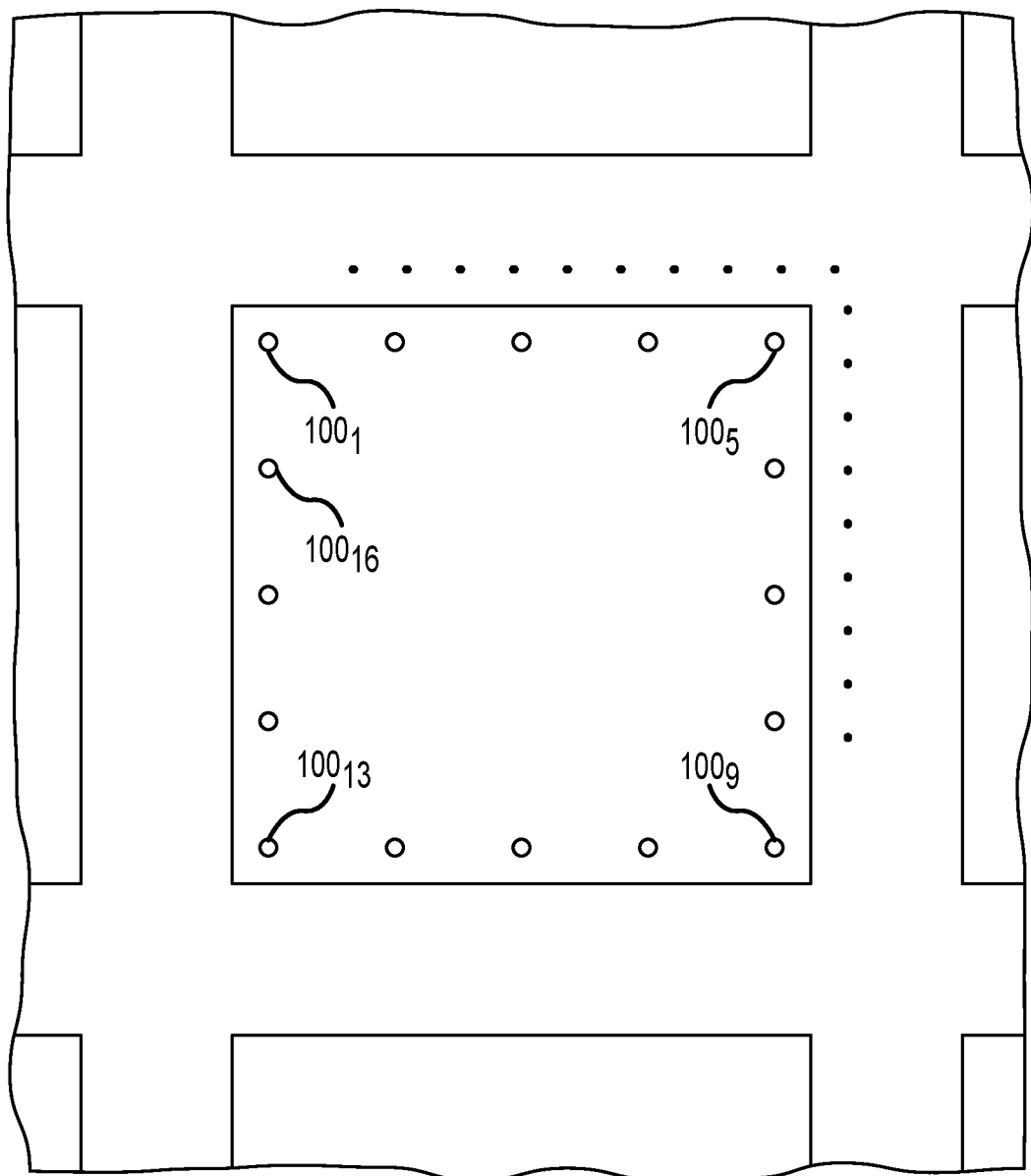
FIG. 10 depicts a plurality of battery storage poles on a city block.

FIG. 10 illustrates an embodiment of the present disclosure where a plurality of battery storage poles $100_1$-$100_{16}$ (hereafter 100 and less specifically referenced) are utilized together to form the battery storage system. In the illustrated embodiment, sixteen battery storage poles 100 are disposed on a single city block 300. Depending on the cavity sizes of the vaults of the battery storage poles 100, storage could vary between 750 and 1000 kWh. That is, a megawatt hour of power may be available per block for augmenting the local power grid. In an embodiment, one or more such battery storage systems may be configured into a micro-grid. In such an arrangement, the grid may be connectable to and dis-connectable from the battery storage system. In this arrangement, local loads would rely primarily on power from the micro-grid (i.e., from by the battery storage systems). By way of example, a region of a town or city may be supported by a power substation connected to the grid. In such an arrangement, the battery storage system may likewise be connected to the power substation such that if there is a grid power failure, the battery storage system may provide power to the substation and maintain the region with backup power.

Figure 11:
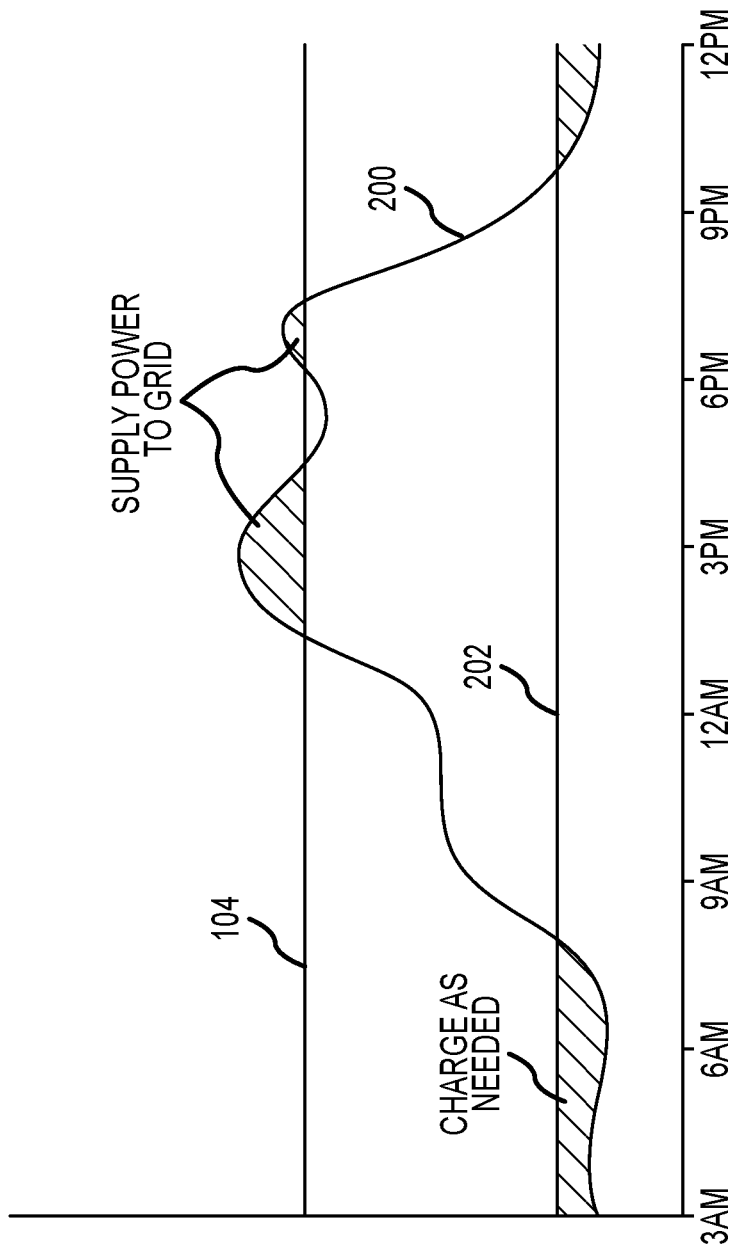
FIG. 11 depicts an energy usage curve.

In a further arrangement, the battery storage system may be utilized dynamically in conjunction with the power grid. By way of example, one or more battery storage systems may be utilized to balance the load (e.g., inductive load) of the local or regional power grid. FIG. 11 is a diagram that illustrates an exemplary inductive load of a regional portion of an electric power grid. This diagram is exemplary and is in no way limiting. As shown by the regional load curve 200, in the early morning hours and late evening hours, the load demand of the regional electrical gird is typically low. During the working hours and especially in the afternoons (e.g., in areas with air conditioning needs) the load demand increases. When installed, the battery storage system described above may be utilized to balance or smooth (i.e., reduce) the peak demand on the grid. As shown in the diagram, during the period of low demand where usage is below a lower threshold 202, the battery storage poles 100 may store electrical energy in their batteries. As a result, the power demand of the grid may be increased during periods of low usage. During the periods of high-power demand above an upper threshold 204, the battery storage poles may provide electrical energy stored in their batteries to the regional grid to reduce the power demand on the power grid to the upper threshold. Effectively, such a system may allow, among other uses, acting as a source or a sink for the regional grid to reduce power fluctuations which may prevent a utility from having to start-up additional generating units or purchase available power from third parties. Along these lines, it will be appreciated that power to charge the battery storage poles may be purchased at off-peak times and rates and provided back to the grid or consumers at peak times and peak rates.

Figure 12:
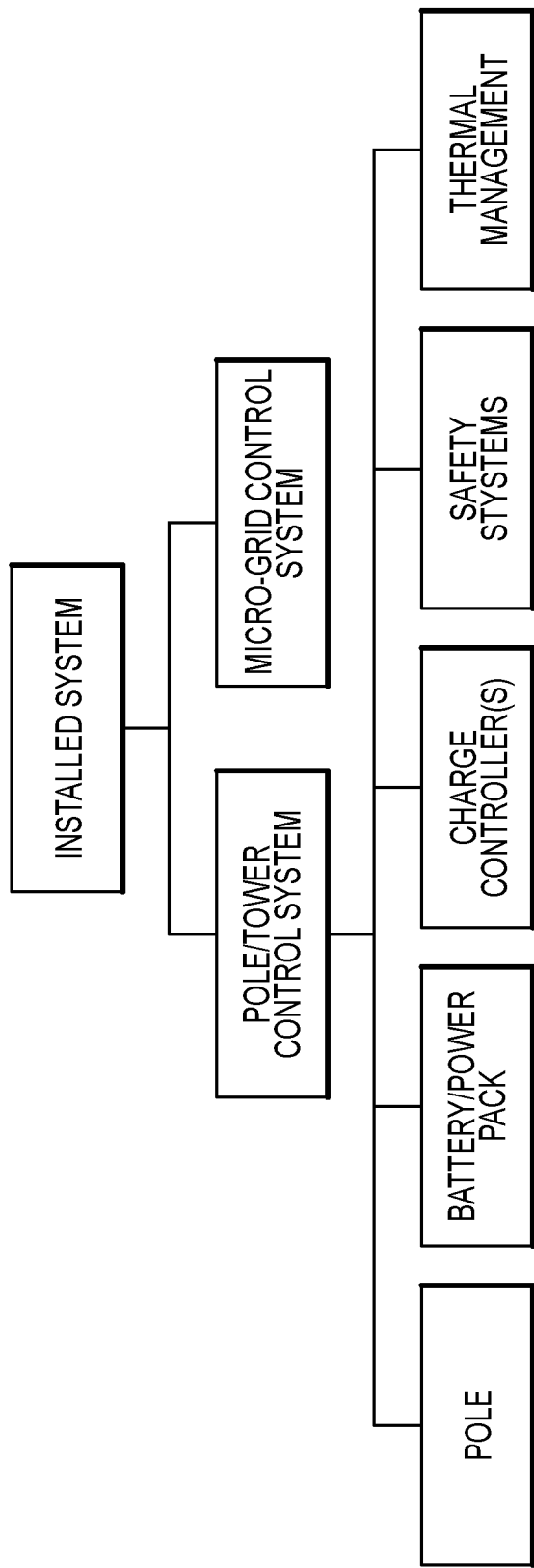
FIG. 12 depicts a control system.

FIG. 12 illustrates one embodiment of an overall system incorporating one or more battery storage poles. From the public's perspective, they simply see an installed electrical system, which may include one or more cell towers and or/other infrastructure elements. The system is controlled utilizing a micro-grid control system as well as a tower/pole control system. The pole control system coordinates operation of various elements of the pole and may be disposed within the pole itself. The pole and/or vault houses the power system, the charge controller, safety system and thermal management systems. The power pack is interconnected to the control system and provides physical protection and connectivity amongst the various cells while also providing power at correct amperages and voltages. One or more charge controllers manage the power pack and individual cells "state of charge" assuring power is available when needed as well as permitting charging the various cells when power is available. One or more safety systems may be incorporated into the tower system. Such safety systems include active and passive system components such as fire suppression as well as electrical disconnect. The tower system may further include thermal management which may be active and/or passive manage the temperature of the vault and its internal components.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples described herein but is to be accorded the broadest scope consistent with the principles and novel features disclosed herein. It is intended that the appended claims be construed to include alternative embodiments to the extent permitted by the prior art.

What is claimed is:

1. A battery storage pole system comprising:
 a battery storage housing for disposition at least partially below a ground surface, the battery storage housing having an upper end, a lower end and interior volume with an access opening extending through the upper end of the battery storage housing;
 a plurality of batteries disposed within the interior volume of the housing;
 a pole having an upper pole end and a lower pole end configured for attachment attached proximate to the upper end of the battery storage housing, the pole movable between a first position where the lower pole end of the pole covers the access opening and a second position where the lower pole end of the pole exposes the access opening;
 a controller configured to charge the batteries from a power source and discharge the batteries to electrical componentry supported by the pole.

2. The system of claim 1, wherein a longitudinal axis of the pole between the upper pole end and the lower pole end of the pole defines a vertical axis of the system.

3. The system of claim 2, wherein the pole moves between the first position and the second position in a direction that is transverse to the vertical axis.

4. The system of claim 3, further comprising:
 a track disposed proximate to the upper end of the batter storage housing, wherein the lower pole end of the pole is connected to the track.

5. The system of claim 4, wherein the pole moves along the track between the first position and the second position.

6. The system of claim 2, wherein the pole rotates between the first position and the second position.

7. The system of claim 6, wherein the pole rotates about an axis that is substantially parallel to the vertical axis.

8. The system of claim 6, wherein the pole rotates about an axis that is transvers to the vertical axis.

9. The system of claim 1, further comprising:
a locking element for selectively locking the pole in the first position.

10. The system of claim 1, wherein the power source is an electrical grid and wherein the controller is configured to charge the batteries from the grid and discharge the batteries to the grid.

11. The system of claim 1, wherein the electrical componentry comprises at least one of:
cell antennas supported by the pole;
sensors supported by the pole;
cameras supported by the pole;
traffic lights supported by the pole.

12. The system of claim 1, further comprising a plurality of battery storage poles wherein each pole is connected to an electrical grid and the other poles, wherein the plurality of battery storage poles form a micro-grid.

13. The system of claim 1, further comprising:
a lift system for moving the batteries through the access opening from a location disposed at least partially below a surface of the ground to a location at least partially above the surface of the ground.

14. A battery storage pole system comprising:
a battery storage housing for disposition at least partially below a ground surface, the battery storage housing having an upper end, a lower end and interior volume with an access opening extending through the upper end of the battery storage housing;
a plurality of batteries disposed within the interior volume of the housing;
a pole having an upper pole end and a lower pole end configured for attachment attached proximate to the upper end of the battery storage housing, the pole movable between a first position where the lower pole end of the pole covers the access opening and a second position where the lower pole end of the pole exposes the access opening; and
a lift system for moving the batteries through the access opening from a location disposed at least partially below a surface of the ground to a location at least partially above the surface of the ground.

* * * * *